United States Patent
Gupta et al.

(10) Patent No.: US 12,496,037 B2
(45) Date of Patent: Dec. 16, 2025

(54) MEDICAL APPARATUS WITH ENHANCED ULTRASOUND VISIBILITY

(71) Applicant: Parker-Hannifin Corporation, Cleveland, OH (US)

(72) Inventors: Sahil Gupta, Aurora, OH (US); Steve Powell, Cleveland, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 504 days.

(21) Appl. No.: 17/621,424

(22) PCT Filed: Oct. 4, 2019

(86) PCT No.: PCT/US2019/054807
§ 371 (c)(1),
(2) Date: Dec. 21, 2021

(87) PCT Pub. No.: WO2021/011024
PCT Pub. Date: Jan. 21, 2021

(65) Prior Publication Data
US 2022/0354454 A1    Nov. 10, 2022

Related U.S. Application Data

(60) Provisional application No. 62/873,348, filed on Jul. 12, 2019.

(51) Int. Cl.
*A61B 8/08* (2006.01)
*A61B 90/00* (2016.01)

(52) U.S. Cl.
CPC ........... *A61B 8/0833* (2013.01); *A61B 90/39* (2016.02); *A61B 2090/3925* (2016.02)

(58) Field of Classification Search
CPC ................. A61B 8/0833; A61B 90/39; A61B 2090/3904–3995; A61K 49/223;
(Continued)

(56) References Cited

U.S. PATENT DOCUMENTS 5,201,314 A   4/1993   Bosley, Jr. et al.
5,921,933 A   7/1999   Sarkis et al.
(Continued)

FOREIGN PATENT DOCUMENTS

EP    1 118 337 A2    7/2001
WO    2012/025854 A1  3/2012
(Continued)

OTHER PUBLICATIONS

Examination report prepared by the European Patent Office in application No. EP 19 794 314.2 dated Jan. 29, 2024.
(Continued)

*Primary Examiner* — Anh Tuan T Nguyen
*Assistant Examiner* — Younhee Choi
(74) *Attorney, Agent, or Firm* — McDonnell Boehnen Hulbert & Berghoff LLP

(57) ABSTRACT

An example medical apparatus includes a tubular structure. The tubular structure includes an echogenic layer that is a multiphase polymer composite. The multiphase polymer composite includes a polymer matrix phase, a first non-polymeric phase including gas voids entrapped within the polymer matrix phase, and a second non-polymeric phase including particles embedded within the polymer matrix phase. Catheters having respective echogenic layers are also described.

17 Claims, 7 Drawing Sheets

(58) Field of Classification Search
CPC ............ A61M 25/005; A61M 25/0108; A61M 25/0053; A61M 25/0008
See application file for complete search history.

(56) References Cited

U.S. PATENT DOCUMENTS

| | | | |
|---|---|---|---|
| 6,506,156 B1* | 1/2003 | Jones | A61K 49/223 600/432 |
| 7,014,610 B2 | 3/2006 | Koulik | |
| 7,065,394 B2* | 6/2006 | Hobot | A61M 25/0108 606/108 |
| 7,458,967 B2 | 12/2008 | Appling et al. | |
| 8,162,939 B2* | 4/2012 | Shizuka | A61B 18/1492 606/46 |
| 8,398,596 B2 | 3/2013 | Field | |
| 8,845,614 B2 | 9/2014 | Raabe et al. | |
| 9,061,117 B2 | 6/2015 | Roberts et al. | |
| 9,561,023 B2 | 2/2017 | Raabe et al. | |
| 2004/0077948 A1 | 4/2004 | Molante et al. | |
| 2004/0138566 A1* | 7/2004 | Crawford Kellar | A61B 8/481 600/458 |
| 2008/0058702 A1 | 3/2008 | Arndt et al. | |
| 2008/0154136 A1* | 6/2008 | Webler | A61B 8/0833 600/463 |
| 2012/0059308 A1* | 3/2012 | Hsu | A61M 19/00 604/528 |
| 2012/0111339 A1* | 5/2012 | Barthe | A61B 8/00 128/846 |
| 2012/0265055 A1 | 10/2012 | Melsheimer et al. | |
| 2013/0204232 A1* | 8/2013 | Wieser | G10K 11/20 604/528 |
| 2018/0177980 A1* | 6/2018 | Khalaj | A61M 25/0606 |
| 2021/0060308 A1* | 3/2021 | Willard | A61M 25/00 |
| 2021/0169579 A1* | 6/2021 | Laviola | A61B 34/20 |
| 2022/0061881 A1* | 3/2022 | Breek | A61B 17/3403 |

FOREIGN PATENT DOCUMENTS

| | | |
|---|---|---|
| WO | 2012/148265 A1 | 11/2012 |
| WO | 2013/013080 A1 | 1/2013 |
| WO | 2018/217151 A1 | 11/2018 |

OTHER PUBLICATIONS

International Search Report and Written Opinion for International Patent Application No. PCT/US2019/054807 mailed Mar. 25, 2020.

* cited by examiner

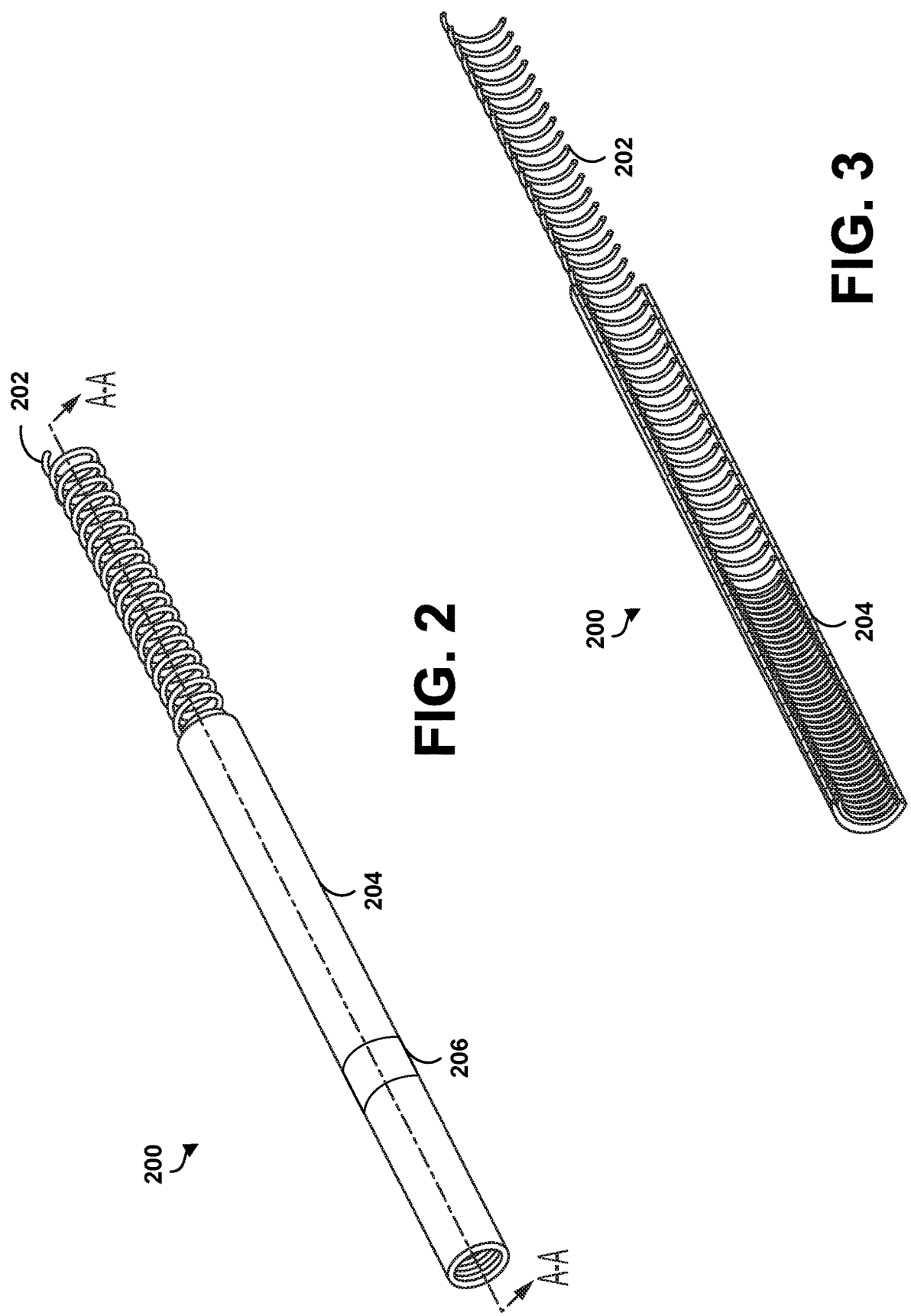

MEDICAL APPARATUS WITH ENHANCED ULTRASOUND VISIBILITY

CROSS-REFERENCE TO RELATED APPLICATIONS

The present application is a national phase of International Patent Application Pub. No. WO2021/011024, titled "MEDICAL APPARATUS WITH ENHANCE ULTRASOUND VISIBILITY" and filed on Oct. 4, 2019, the content of which is hereby incorporated by reference in its entirety.

International Patent Application Pub. No. WO2021/011024 claims priority from U.S. Provisional Patent Application No. 62/873,348 filed on Jul. 12, 2019, the content of which is hereby incorporated by reference in its entirety.

FIELD

The present disclosure relates generally to medical devices, and more particularly, to medical devices that exhibit or impart enhanced ultrasound visibility.

BACKGROUND

Ultrasound waves, similar to light waves, are reflected, transmitted, or scattered by objects. If the dimensions of an object are much larger than the wavelength of sound waves, then reflection and refraction occur at an interface of two mediums. The extent of reflection and transmission of longitudinal ultrasound waves can be described by pressure reflectivity (R) and pressure transmittivity (T) as, $$R = \frac{\frac{Z_2}{\cos\theta_t} - \frac{Z_1}{\cos\theta_i}}{\frac{Z_2}{\cos\theta_t} + \frac{Z_1}{\cos\theta_i}} \quad (1)$$

$$T = \frac{\frac{2Z_2}{\cos\theta_t}}{\frac{Z_2}{\cos\theta_t} + \frac{Z_1}{\cos\theta_i}} \quad (2)$$

where $Z_1$ and $Z_2$ are acoustic impedance of medium 1 and 2, respectively, and $\theta_i$ and $\theta_t$ are angles of the incident and transmitted waves, respectively. Thus, ultrasound reflectivity from an interface between two mediums can be maximized by maximizing the difference in acoustic impedance between the two mediums.

On the other hand, if the dimensions of an object are smaller than the wavelength of ultrasound waves, then scattering occurs. As the object size decreases, the extent of scattering also decreases. If the incident wave is a plane wave, then the reflected and transmitted waves are also plane waves propagating at a certain angle, but the scattered wave is a spherical wave which propagates at all angles. Therefore, even though the intensity of a scattered wave, and hence its detectability by an ultrasound device, is less than that of a reflected wave, a positive result of scattering is that the scattered wave is detectable over a wide range of angles of incidence at the interface.

In the medical field, ultrasound devices can be used to detect objects that are mounted on, positioned in, or otherwise placed in a body during a medical procedure. Examples of such objects include catheters, endovascular sheaths, endoscopes, endotracheal tubes, etc.

A catheter, for instance, can include three or more layers with the innermost layer being a core tube, the middle layer being a braided or coiled wire element, and the outer layer being an outer jacket. Other catheters can include more or less layers.

Existing techniques for identifying a catheter within a body sometimes focus on identifying a tip of the catheter, with the tip having enhanced ultrasound visibility. For example, the tip can be fabricated with special surface features that exhibit enhanced visibility during ultrasound imaging.

SUMMARY

In one example, a medical apparatus having a tubular structure is described. The tubular structure includes an echogenic layer that is a multiphase polymer composite. The multiphase polymer composite includes a polymer matrix phase, a first non-polymeric phase including gas voids entrapped within the polymer matrix phase, and a second non-polymeric phase including particles embedded within the polymer matrix phase.

In another example, a catheter is described. The catheter includes an inner coil and an echogenic layer surrounding the inner coil. The echogenic layer is a multiphase polymer composite. The multiphase polymer composite includes a polymer matrix phase, a first non-polymeric phase including gas voids entrapped within the polymer matrix phase, and a second non-polymeric phase including particles embedded within the polymeric matrix phase.

In another example, a catheter is described. The catheter includes an echogenic layer and an outer layer surrounding the echogenic layer. The echogenic layer is a multiphase polymer composite. The multiplayer polymer composite includes a polymer matrix phase, a first non-polymeric phase including gas voids entrapped within the polymer matrix phase, and a second non-polymeric phase including particles embedded within the polymer matrix phase.

In still another example, a catheter is described. The catheter includes an inner layer and an echogenic layer surrounding the inner layer. The echogenic layer is a multiphase polymer composite. The multiphase polymer composite includes a polymer matrix phase, a first non-polymeric phase including gas voids entrapped within the polymer matrix phase, and a second non-polymeric phase including particles embedded within the polymeric matrix phase.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

FIG. 2 illustrates an example catheter, according to an example embodiment.

FIG. 3 illustrates a cross-sectional side view of the example catheter of FIG. 2, shown along line A-A.

DETAILED DESCRIPTION

Figure 1:
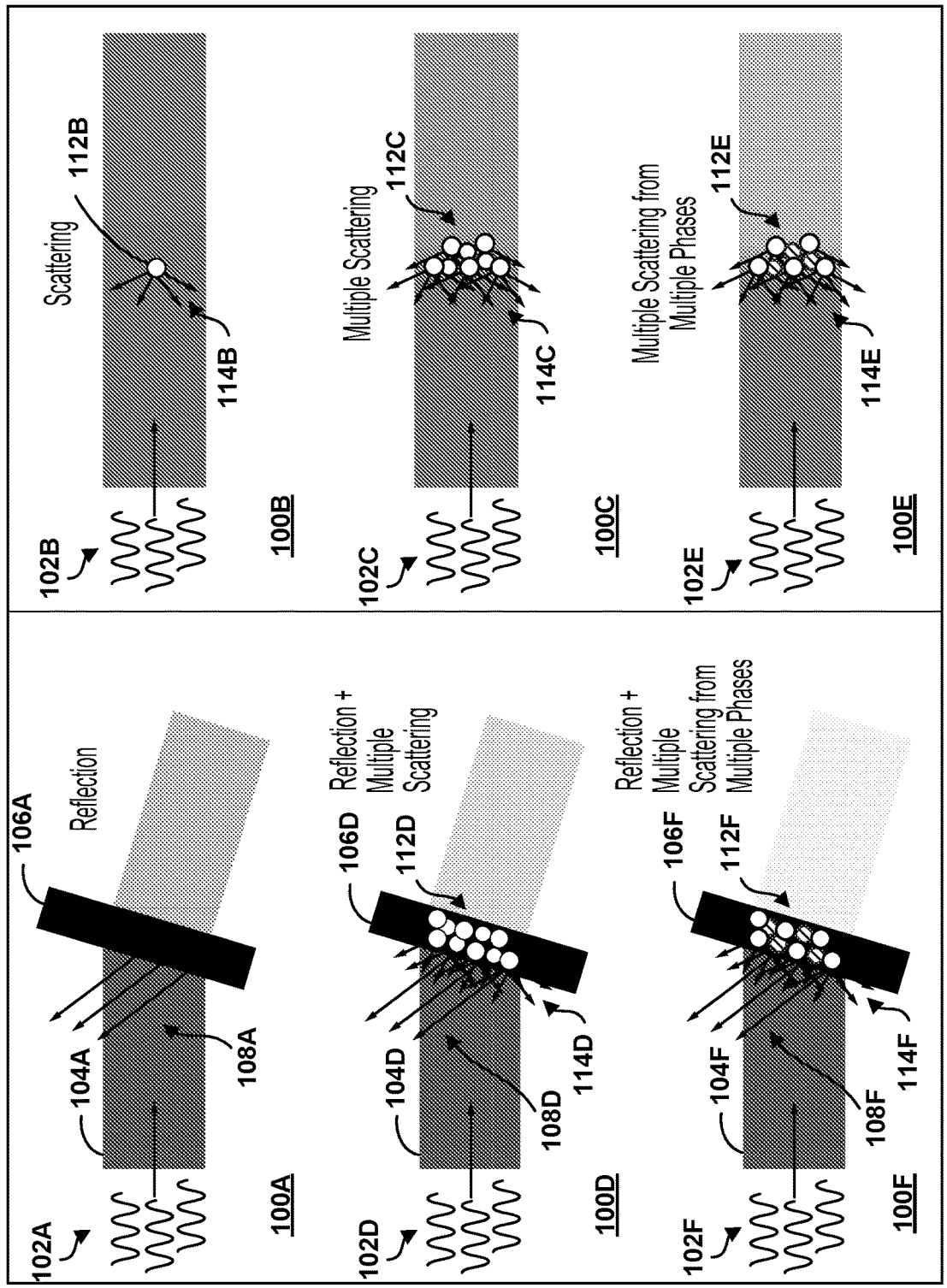
FIG. 1 illustrates the synergistic effect of a multiphase polymer composite on ultrasound reflection and scattering.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Conventional approaches for enhancing ultrasound visibility of medical components are based on maximizing the acoustic impedance difference at an interface of two mediums, thereby maximizing reflectivity. Those designs rely on the use of only one interface at which reflection or scattering occurs. However, the reflected or scattered signal from just a single interface provides relatively weak visibility using ultrasound.

Described herein are medical apparatuses that exhibit or impart enhanced ultrasound visibility. An example medical apparatus includes a tubular structure having an echogenic layer. The echogenic layer is a multiphase polymer composite. The multiphase polymer composite includes a polymer matrix phase, a first non-polymeric phase including gas voids entrapped within the polymer matrix phase, and a second non-polymeric phase including particles embedded within the polymer matrix phase.

In one example, the multiphase polymer composite is a polymer-metal-foam composite, with the polymer matrix phase including a continuous matrix that is formed from at least one polymer, such as polyethylene or polypropylene. The first non-polymeric phase can include air voids entrapped within the polymer matrix. The air voids could be created using a foaming process such that the foam morphology may be a closed-cell structure or a combination of closed-cell and open-cell cellular structure. The second non-polymeric phase can include one or more metals, organometallics, ceramics, alloys, inorganic compounds, or a combination thereof that are dispersed within the continuous matrix. The particles of the second non-polymeric phase can include nanoparticles, microparticles, or larger aggregated particles.

Advantageously, this design of the echogenic layer increases the interaction of ultrasound waves with the tubular structure during ultrasound imaging. Using a multiphase polymer composite for the echogenic layer increases detection intensity by increasing contributions from both reflected and scatter signals. With respect to the reflected signals, use of the multiphase polymer composite increases the acoustic impedance of the echogenic layer, thereby increasing the acoustic impedance difference between biological tissue and the echogenic layer. With respect to the scattered signals, the embedded particles of the multiphase polymer composite increase the number of scattering centers within the tubular structure, thereby increasing the scattered signals.

In addition, another advantage of increasing the number of scattering centers is that an increased interaction of ultrasound waves with the scattering centers significantly reduces the transmitted wave intensity. Hence, the area directly underneath/behind the tubular structures experiences relatively weak interaction with the ultrasound waves, and the area appears as a dark region in an ultrasound image. This dark region is easily distinguishable from its environment, and the appearance of the dark region further enhances the visibility of the tubular structure during ultrasound imaging.

As described more fully below, use of both a first non-polymeric phase including gas voids and a second non-polymeric phase including particles yields an unexpected synergistic effect in terms of ultrasound visibility. Using the first non-polymeric phase and second non-polymeric phase together results in an exceptionally high echogenicity that is otherwise not expected from an additive model. Briefly, the multiphase polymer composite has an echogenicity that is far greater than a sum of the echogenicity of a comparable polymer-metal composite layer and the echogenicity of a comparable polymer-foam layer.

Furthermore, unlike conventional tubular structures for which ultrasound visibility is limited to a distal part (e.g., a tip), the tubular structure having the echogenic layer may exhibit enhanced visibility throughout an entire length of the tubular structure. This feature can allow a user to image an entire contour of the tubular structure inside the body and, as a result, more readily ascertain a location of the tubular structure within the body.

In addition, the multiphase polymer composite may reduce the dependence of the ultrasound visibility of the tubular structure on an angle of insertion within a medium, angle of incidence of ultrasound waves, and the angle/position of a detector with respect to the incident ultrasound waves. For instance, the ultrasound visibility of the tubular structure may be minimally affected or almost independent of the angle of insertion within a medium, angle of incidence of ultrasound waves, and the angle/position of a detector with respect to the incident ultrasound waves. These properties of the tubular structure permit more accurate positioning of the medical apparatus within small surgical spaces. In addition, these properties facilitate the use of thin structures in complicated and demanding surgical procedures.

Various other features of the medical apparatuses are also described hereinafter with reference to the accompanying figures. Although portions of this disclosure refer to catheters by way of example, the examples are not meant to be limiting. The medical apparatuses can take other tubular forms as well, such as endovascular sheaths, endoscopes, endotracheal tubes, etc., with modifications as appropriate. The medical apparatus can also take other non-tubular forms as well, such as balloons, artificial valves (e.g., heart valves), bifurcated grafts (e.g., stent graphs), coatings or films, sheets or strips (e.g., those used as fiducial markers), or solid rods/cylinders (e.g., surgical sutures). Further, the principles of the present disclosure are also readily applicable to internal tracking procedures carried out in many different areas of the body, such as the lungs, gastro-intestinal tract, excretory organs, blood vessels, etc.

Referring now to FIG. 1, the synergistic effect of a multiphase polymer composite on ultrasound reflection and scattering is illustrated. As shown in schematic diagram 100A of FIG. 1, when ultrasound waves 102A impinge upon an interface between a first medium 104A and a second medium 106A, a portion of the ultrasound waves 102A are reflected back at the interface as reflected signals 108A. In line with the discussion above, increasing the impedance differential between the first medium 104A and the second medium 106A increases the intensity of the reflected signals 108A and decreases the intensity of the transmitted signal.

As shown in schematic diagram 100B, when ultrasound waves 102B impinge upon a scattering center 112B (e.g., a particle), a portion of the ultrasound waves 102B are scattered by the scattering center 112B, yielding scattered signals 114B.

Increasing the number of scattering centers increases the intensity of the scattered signals 114B. For instance, as shown in schematic diagram 100C, ultrasound waves 102C scattered by a plurality of scattering centers 112C yields scattered signals 114C having a greater intensity than an intensity of scattered signals 114B.

Further, as shown in schematic diagram 100D, for a second medium 106D having a plurality of scattering centers 112D, ultrasound waves 102D impinging on an interface between a first medium 104D and the second medium 106D yield both reflected signals 108D and scattered signals 114D.

Still further, as shown in schematic diagram 100E, ultrasound waves 102E scattered by a plurality of scattering centers 112E having multiple phases yield scattered signals 114E having a greater intensity than an intensity of scattered signals 114C. The multiple phases can, for instance, include gas voids and particles entrapped within a medium, two different types of gas voids, two different types of particles, etc.

Finally, schematic diagram 100F shows ultrasound waves 102F impinging on an interface between a first medium 104F and a second medium 106F, with the second medium 106F including a plurality of scattering centers 112F having multiple phases. In this arrangement, reflected signals 108F and scattered signals 114F are created.

For each of the schematic diagrams shown in FIG. 1, the detected signal can be described as the sum of the reflected signals and the scattered signals. Assuming that the intensity of the ultrasound waves is constant for each schematic diagram, the arrangement shown in schematic diagram 100F has the greatest detected signal intensity and the lowest transmitted intensity.

Furthermore, the detected signal intensity for the arrangement shown in schematic diagram 100F may be more than two times greater than the detected signal intensity for the arrangement shown in schematic diagram 100D, due to the use of multiple different phases together within second medium 106F.

As an example of this synergistic effect, an experiment was conducted to analyze the ultrasound visibility of various prototypes of tubular structures. The characteristics and the ultrasound visibility of the different prototypes are shown in Table 1.

TABLE 1

|  | Example 1 | Example 2 | Example 3 | Example 4 |
|---|---|---|---|---|
| Size | | | | |
| Outer Diameter (mm) | 0.960 | 0.991 | 1.100 | 1.110 |
| Inner Diameter (mm) | 0.579 | 0.734 | 0.889 | 0.912 |
| Wall thickness (mm) | 0.191 | 0.128 | 0.105 | 0.099 |

TABLE 1-continued

|  | Example 1 | Example 2 | Example 3 | Example 4 |
|---|---|---|---|---|
| Materials | | | | |
| Polymer | Polyethylene | Polyethylene | Polyethylene | Polyethylene |
| Filler | — | Antimony Trioxide | — | Antimony Trioxide |
| Filler Concentration (wt %) | — | 24 | — | 24 |
| Foam/air pockets | — | — | Yes | Yes |
| Characteristics | | | | |
| Density (g/cm$^3$) | 0.920 | 1.123 | 0.632 | 0.982 |
| Average filler size (mm) | — | 0.002 | — | 0.002 |
| Average Cell size (mm) | — | — | 0.030 | 0.020 |
| Void fraction (vol %) | — | — | 31.3 | 10.7 |
| Cell Morphology | — | — | Closed cell | Closed cell |
| Ultrasound Visibility | | | | |
| Intensity ratio w.r.t. Reference | 1 | 9 | 1251 | 2806 |

In the experiment, Example 1 is a base polymer (i.e. polyethylene) used as a reference, Example 2 is a polymeric-metal composite including the reference polymer and antimony trioxide filler particles, Example 3 is a polymer foam including the reference polymer, and Example 4 is a polymer-metal-foam composite including the reference polymer and antimony trioxide filler particles at the same concentration as Example 2. Testing was conducted in a non-attenuating medium.

As indicated in Table 1, the ultrasound visibility for Example 4 is significantly greater than the sum of the ultrasound visibility for Example 2 and Example 3 and more than twice the ultrasound visibility for Example 3. In other words, including both metal particles and foam/air pockets within the reference polymer created an unexpected synergistic effect that significantly increased the ultrasound visibility of Example 4.

FIG. 2 illustrates an example catheter 200, according to an example embodiment. Further, FIG. 3 illustrates a cross-sectional side view of the catheter 200 of FIG. 2, shown along line A-A. As shown in FIGS. 2 and 3, the catheter 200 has an overall tubular structure. Further, the catheter 200 includes an inner coil 202 and an echogenic layer 204 surrounding the inner coil 202. The echogenic layer 204 can be provided throughout at least a majority of a length of the catheter 200, either continuously or intermittently.

The inner coil 202 can be a metal coil. For instance, the inner coil can be a steel coil. Alternatively, the inner coil 202 can be a non-metal coil.

In line with the discussion above, the echogenic layer 204 can include a multiphase polymer composite having a polymer matrix phase, a first non-polymeric phase including gas voids entrapped within the polymer matrix phase, and a second non-polymeric phase including particles embedded within the polymer matrix phase.

The polymer matrix phase can include a continuous matrix that is formed from at least one polymer. For instance, the polymer matrix phase can include a base polymer such as polyethylene, polypropylene, polyurethane, or nylon. Alternatively, other types of base polymers include, but are not limited to, polyolefins, polyamides, polyesters, polysulfides, polysulfones, polyketones, fluoropolymers such as FEP, PTFE, PFA, ETFE, PVDF etc., thermoplastic elastomers, thermoplastic vulcanizates, cross-linked rubbers, and ionomers. The polymer matrix phase can constitute anywhere from about 1% to about 99% of the volume of the echogenic layer 204. For instance, the polymer matric phase can constitute 30% or 70% of the volume of the echogenic layer 204.

Generally, the acoustic impedance of common polymers is approximately $2 \times 10^{-6}$ kg·m$^{-2}$s$^{-1}$ or within the same order of magnitude. The acoustic impedance of biological components such as fat, blood, bone, muscle, water, etc. is also of the same order as polymers. Hence, it is not surprising that catheters made from common polymers do not exhibit good ultrasound visibility. The acoustic impedance of the echogenic layer 204, however, is greater than that of the base polymer due to the inclusion of the first non-polymeric phase and the second non-polymeric phase.

The gas voids of the first non-polymeric phase can be created using a polymer foaming process, and can be randomly distributed throughout the echogenic layer 204. The gas voids can constitute anywhere from about 1% to about 99% of the volume of the echogenic layer 204. For instance, the gas voids can constitute 15% or 50% of the volume of the echogenic layer 204. Due to the inclusion of the gas voids, the multiphase polymer composite can have a closed-cell structure or a semi-closed cell structure.

In one example, the first non-polymeric phase can include carbon dioxide pockets within the polymer matrix phase. In another example, the first non-polymeric phase can include methane pockets within the polymer matrix phase. Other types of gases can also be used.

The particles of the second non-polymeric phase can also be distributed throughout the echogenic layer 204. Further, the particles can constitute anywhere from about 1% to about 99% of the weight of the echogenic layer 204. For instance, the particles can constitute 15% or 50% of the weight of the echogenic layer 204. The particles can include metal particles, organometallic particles, ceramic particles, alloy particles, inorganic particles, and/or a combination thereof. For instance, the particles can include antimony trioxide particles. The particles can be embedded within the echogenic layer 204 during a manufacturing process, such as an extrusion process. In some examples, the particles of the second non-polymeric phase can be solid particles. Additionally or alternatively, the particles can be porous or hollow.

The echogenic layer 204 can be easily identified using ultrasound imaging. The frequency of ultrasound waves used for the imaging may vary from 1-20 MHz, which corresponds to wavelengths of 1540-77 µm, respectively, considering the speed of ultrasound waves in biological tissue is approximately 1540 m/s. When the dimensions of the catheter 200 (e.g., the wall thickness) are much smaller than the wavelength of the ultrasound waves, reflection at the interface might be a minimum and ultrasound detection may be solely based upon scattering.

In some examples, an ultrasound visibility of the catheter 200 may be independent of an angle of incidence of ultrasound waves on a surface of the catheter 200. In other examples, an ultrasound visibility of the catheter 200 may be dependent on an angle of incidence of ultrasound waves on a surface of the catheter 200. For instance, the second non-polymeric phase may have an anisotropic shape, with the particles oriented in a specific direction such that their interaction with ultrasound waves is directionally dependent. In such instances, the particles can include platelets or rods which can be oriented during polymer processing. Alternatively, the particles can be oriented as part of a post-processing operation involving polymer stretching or application of an external stimuli (e.g., an electric field, magnetic field, etc.).

Optionally, the catheter 200 can include a non-echogenic layer 206 along a portion of the length of the catheter 200 such that the echogenicity of the non-echogenic layer 206 is much less compared to the echogenicity of the echogenic layer 204. For instance, the non-echogenic layer 206 can include a non-echogenic polymer film wrapped between the echogenic layer 204. The inclusion of the non-echogenic layer 206 in the catheter 200 can create specific images during imaging, which can help to identify the location of the catheter within a body. The non-echogenic layer 206 can be incorporated more than once in the catheter 200, either periodically or non-periodically.

Advantageously, the catheter 200 can be used with a needle that may or may not be echogenic. If desirable, use of the echogenic layer 204 can replace the function of a needle as an echogenic tracker for ultrasound imaging.

In some examples, the multiphase polymer composite of the echogenic layer 204 can be a multilayered (e.g., micro-layered or nano-layered) structure that is made from two or more layers of multiphase polymer composite. For instance, a multilayered structure having a first layer of a first multiphase polymer composite and a second layer of a second multiphase polymer composite can be fabricated using co-extrusion. Co-extrusion is a technology where two or more different polymers can be extruded simultaneously with each other so that the extrudate is multilayered, with each layer corresponding to a specific polymer. The first multiphase polymer composite and the second multiphase polymer composite can be the same of different. For instance, both the first multiphase polymer composite and the second multiphase polymer composite can include polyethylene, nitrogen gas voids, and barium sulfate particles. Alternatively, the first multiphase polymer composite can include polyethylene, nitrogen gas voids, and barium sulfate particles, and the second multiphase polymer composite can include polypropylene, carbon dioxide gas, and silver particles.

In some examples, the echogenic layer 204 can include a micro-layered structure having hundreds of layers of multiphase polymer composite. The micro-layered structure can be created using microlayer co-extrusion. Microlayer co-extrusion can involve splitting and re-combining a multi-layered extrudate.

The layers of the micro-layered structure can be arranged parallel to each other. Alternatively, the layers of the micro-layered structure can be arranged in a non-parallel manner. For instance, a first layer of a first multiphase polymer composite can be wrapped helically over a second layer of a second multiphase polymer composite. As another example, an extrudate comprising multiple multiphase polymer composite layers can first be extruded using co-extrusion. The resulting extrudate can then be split into a layer A and a layer B using a flow-splitter. Layer B can then rotated by ninety degrees, and then layer A and layer B can be recombined. With this arrangement, layer A and layer B may have a common flow direction, but have different orientations with respect to each other.

In another example, the inner coil 202 of the catheter 200 could be replaced with an inner layer. The inner layer could include a polymer layer, for instance. Hence, an example catheter can include an inner layer and the echogenic layer 204 can surround the inner layer (not shown).

Figure 4:
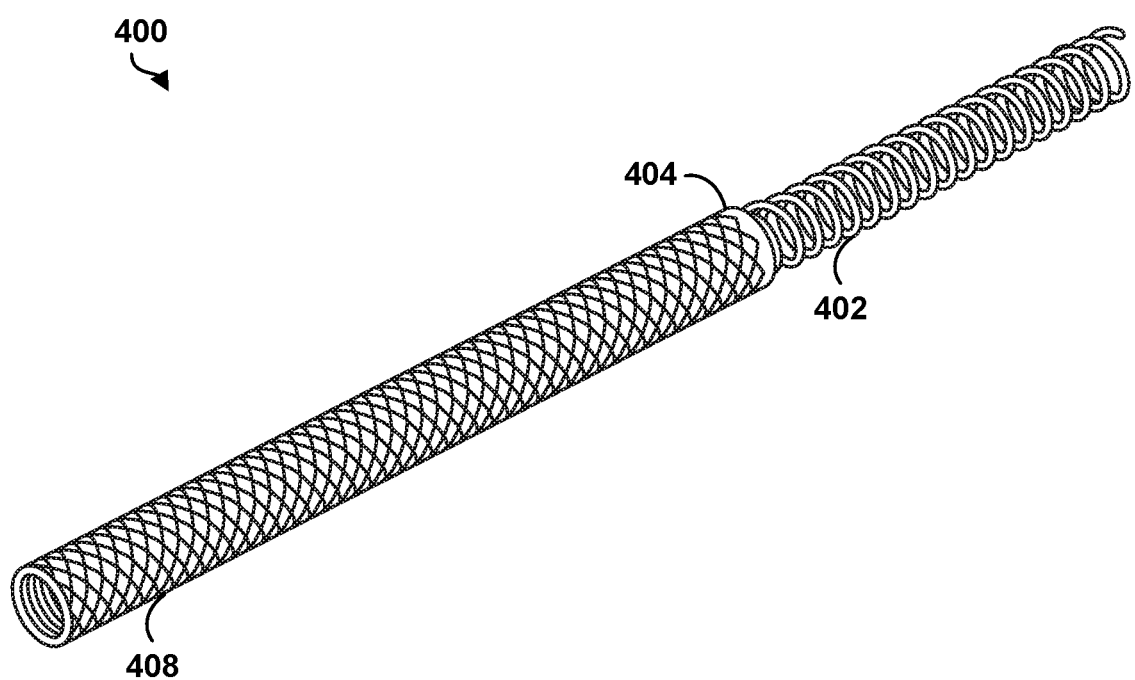
FIG. 4 illustrates another example catheter, according to an example embodiment.

FIG. 4 illustrates another example catheter 400, according to an example embodiment. Like the catheter 200 of FIG. 2, the catheter 400 has an overall tubular structure. Further, like the catheter 200 of FIG. 2, the catheter 400 includes an inner coil 402 and an echogenic layer 404 surrounding the inner coil 402. As such, the inner coil 402 can be similar to the inner coil 202 of FIG. 2, and the echogenic layer 404 can be similar to the echogenic layer 204 of FIG. 2.

The catheter 400 differs from the catheter 200 of FIG. 2, however, in that the catheter 400 further includes a braid 408 surrounding the echogenic layer 404. The braid 408 can be a reinforcement layer that provides rigidity to the catheter 400. In one example, the braid 408 can include a stainless steel braid. Alternatively, the braid 408 can include braided fibers. As another example, the braid 408 can include a braid-reinforced tube. Other examples are also possible.

Figure 5:
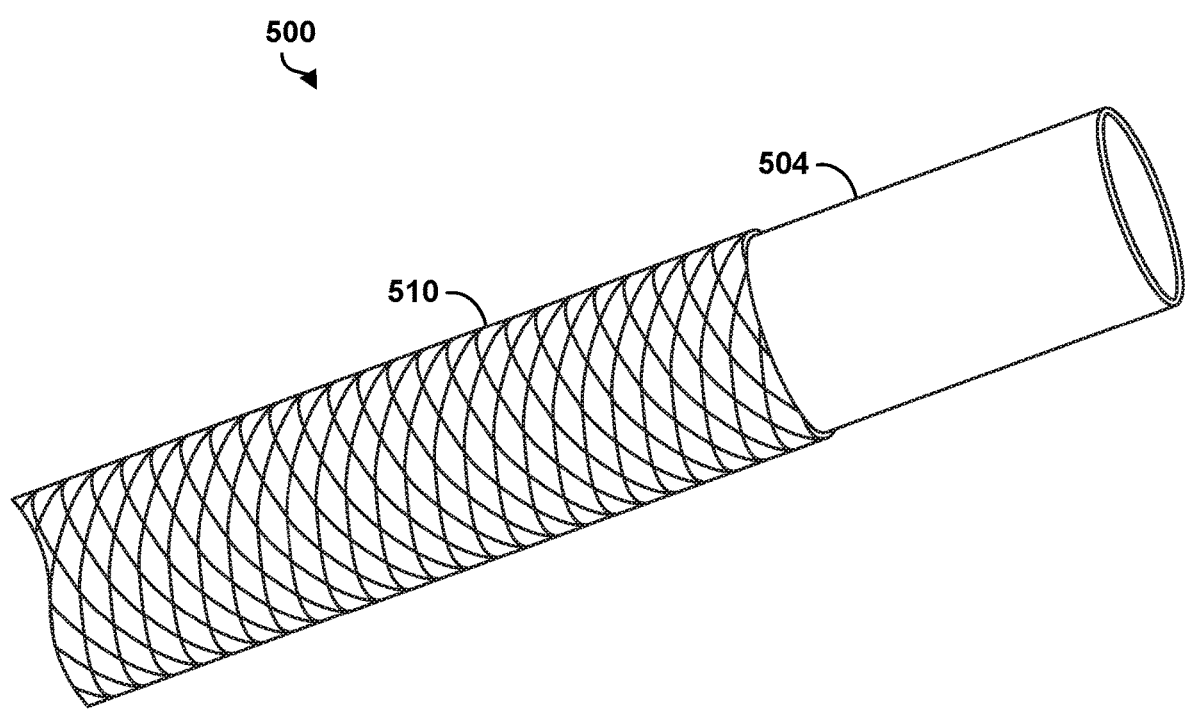
FIG. 5 illustrates another example catheter, according to an example embodiment.

FIG. 5 illustrates another example catheter 500, according to an example embodiment. The catheter 500 has an overall tubular structure. Further, the catheter 500 includes an echogenic layer 504 and a braid 510. Like the echogenic layer 204 of FIG. 2, the echogenic layer 504 can include a multiphase polymer composite, with the multiphase polymer composite including a first polymer matrix phase, a non-polymeric phase including gas voids, and a second non-polymeric phase including particles embedded within the polymer matrix phase.

In another example, the braid 510 of the catheter 500 could be replaced with an outer layer, such as an outer jacket. The outer layer could include a polymer layer, for instance. Hence, an example catheter can include the echogenic layer 504 and an outer layer surrounding the echogenic layer 504 (not shown).

In another example, the catheter 500 can also include an outer layer, such an outer jacket (not shown). The outer layer could include a polymer layer, for instance.

Figure 6:
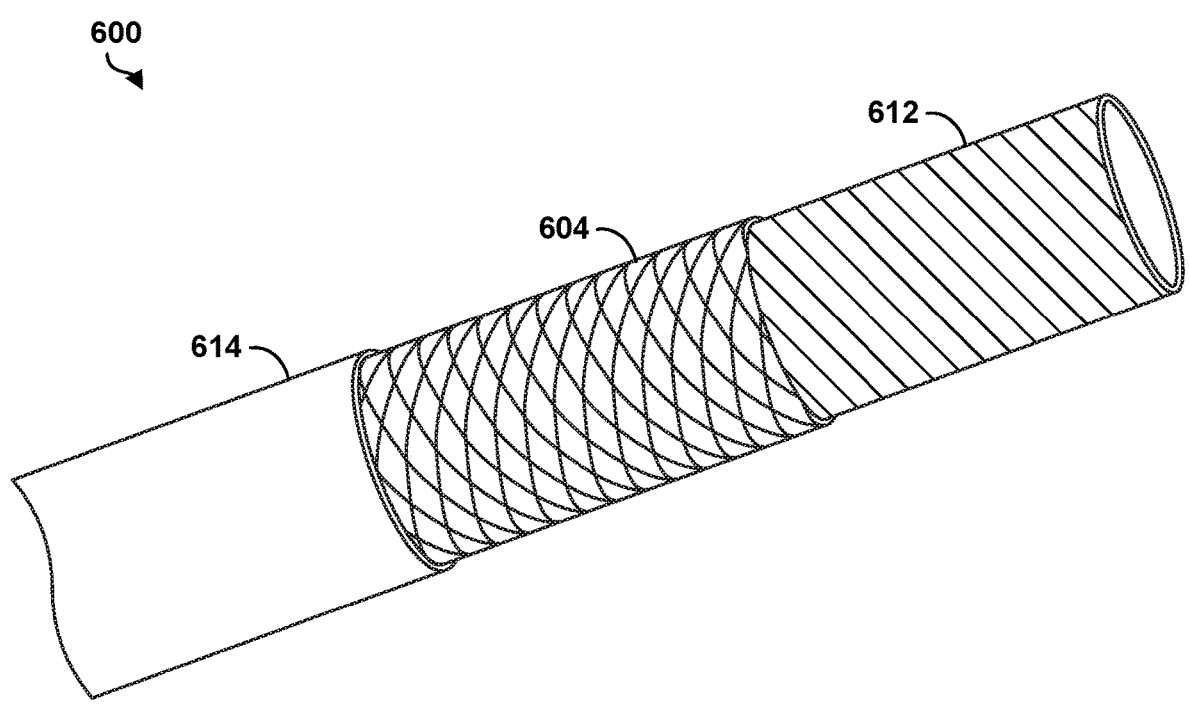
FIG. 6 illustrates still another example catheter, according to an example embodiment.

FIG. 6 illustrates still another example catheter, according to an example embodiment. The catheter 600 has an overall tubular structure, and includes an echogenic layer 604, an inner layer 612, and an outer layer 614. Like the echogenic layer 204 of FIG. 2, the echogenic layer 604 can include a multiphase polymer composite, with the multiphase polymer composite including a first polymer matrix phase, a non-polymeric phase including gas voids, and a second non-polymeric phase including particles embedded within the polymer matrix phase. The echogenic layer 604 differs from the echogenic layer 204 of FIG. 2, however, in that the echogenic layer 604 is a braid.

In another example, the echogenic layer 604 could be a solid layer similar to the echogenic layer 204 of FIG. 2. Hence, an example catheter can include the inner layer 612, the echogenic layer 204, and the outer layer 614, with the echogenic layer 204 surrounding the inner layer 612, and with the outer layer 614 surrounding the echogenic layer 204 (not shown).

In still another example, the echogenic layer 604 could be a solid layer similar to the echogenic layer 504 of FIG. 5, and the outer layer 614 can be replaced with a braid. Hence, an example catheter can include the inner layer 614, the echogenic layer 504, and a braid, with the echogenic layer 504 surrounding the inner layer 614, and with the braid surrounding the echogenic layer 504 (not shown).

Figure 7:
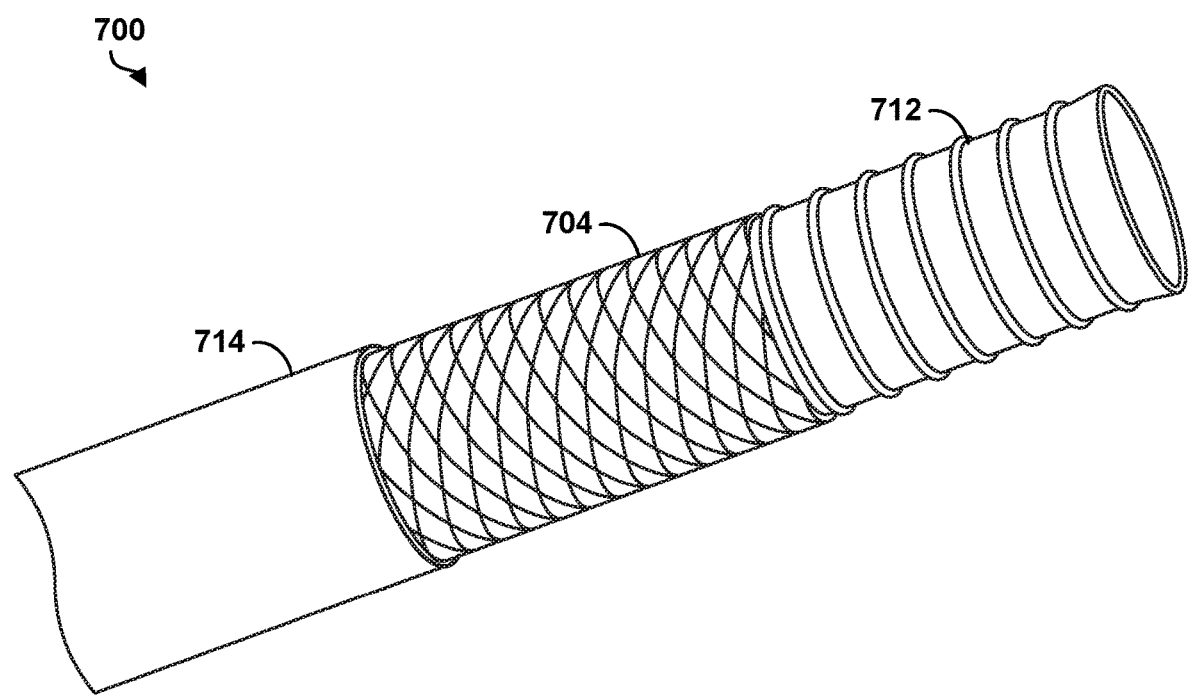
FIG. 7 illustrates still another example catheter, according to an example embodiment.

FIG. 7 illustrates still another example catheter, according to an example embodiment. Like the catheter 600 of FIG. 6, the catheter 700 has an overall tubular structure, and includes an echogenic layer 704, and an outer layer 714. Like the echogenic layer 204 of FIG. 2, the echogenic layer 704 can include a multiphase polymer composite, with the multiphase polymer composite including a first polymer matrix phase, a non-polymeric phase including gas voids, and a second non-polymeric phase including particles embedded within the polymer matrix phase. The catheter 700 differs from the catheter 600 of FIG. 6, however, in that the catheter 700 includes an inner coil 712 rather than an inner layer.

In another example, a catheter can include an inner coil, such as the inner coil 202 of FIG. 2, an inner layer such as the inner layer 612 of FIG. 6, and an echogenic layer such as the echogenic layer 504 of FIG. 5 or the echogenic layer 604 of FIG. 6. With this construction, the inner layer can surround the inner coil, and the echogenic layer can surround the inner layer.

In still another example, a catheter can include only a single layer, and the single layer can be a echogenic layer. For instance, the echogenic layer can be the echogenic layer 504 of FIG. 5 or the echogenic layer 604 of FIG. 6.

Some catheters can include more than three layers. As one example, a catheter can include an inner coil (such as the inner coil 202 of FIG. 2), an echogenic layer (such as the echogenic layer 504 of FIG. 5 or the echogenic layer 604 of FIG. 6) surrounding the inner coil, a braid (such as the braid 408 of FIG. 4) surrounding the echogenic layer, and an outer layer (such as the outer layer 614 of FIG. 6) surrounding the echogenic layer.

As another example, a catheter can include an inner layer (such as the inner layer 612 of FIG. 6, an echogenic layer (such as the echogenic layer 504 of FIG. 5 or the echogenic layer 604 of FIG. 6) surrounding the inner layer, a braid (such as the braid 408 of FIG. 4) surrounding the echogenic layer, and an outer layer (such as the outer layer 614 of FIG. 6) surrounding the echogenic layer.

As another example, a catheter can include an inner coil (such as the inner coil 202 of FIG. 2), an inner layer (such as the inner layer 612 of FIG. 6) surrounding the inner coil, an echogenic layer (such as the echogenic layer 504 of FIG. 5 or the echogenic layer 604 of FIG. 6) surrounding the inner layer, and an outer layer (such as the outer layer 614 of FIG. 6) surrounding the echogenic layer.

As still another example, a catheter can include an inner coil (such as the inner coil 202 of FIG. 2), an inner layer (such as the inner layer 612 of FIG. 6) surrounding the inner coil, an echogenic layer (such as the echogenic layer 504 of FIG. 5 or the echogenic layer 604 of FIG. 6) surrounding the inner layer, and a braid (such as the braid 408 of FIG. 4) surrounding the echogenic layer.

As still another example, a catheter can include an inner coil (such as the inner coil 202 of FIG. 2), an inner layer (such as the inner layer 612 of FIG. 6) surrounding the inner coil, a braid (such as the braid 408 of FIG. 4) surrounding the inner layer, and an echogenic layer (such as the echogenic layer 504 of FIG. 5 or the echogenic layer 604 of FIG. 6) surrounding the braid.

As demonstrated by the various embodiments shown in and described with respect to FIG. 2-7, an echogenic layer having a multiphase polymer composite can be integrated into a catheter in various ways. With each of the embodiments, the catheters can exhibit or impart enhanced ultrasound visibility due to the properties and characteristics of the multiphase polymer composite discussed above. Similar echogenic layers can also be integrated into tubular structures of other medical apparatuses, such as endovascular sheaths, endoscopes, endotracheal tubes, etc.

Figure 8:
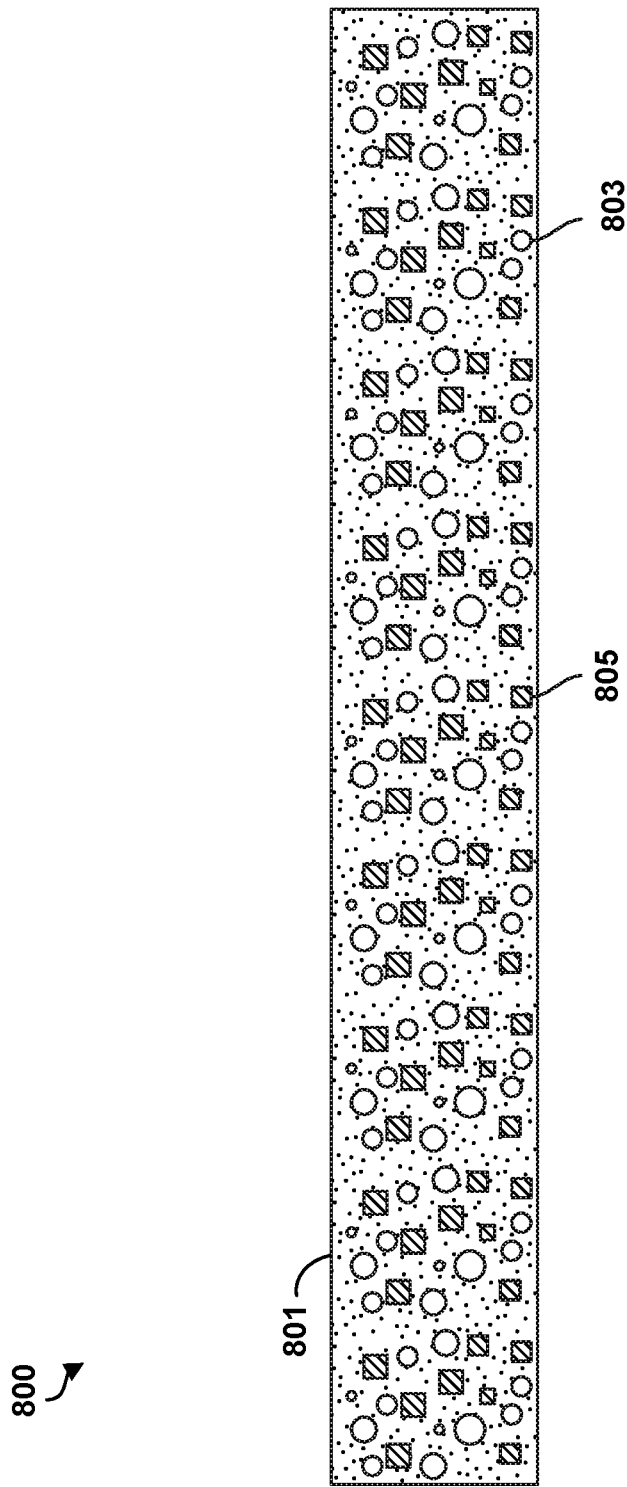
FIG. 8 illustrates an example cross-sectional side view of a multiphase polymer composite, according to an example embodiment.

FIG. 8 illustrates an example cross-sectional side view of a multiphase polymer composite 800, according to an example embodiment. As shown in FIG. 8, the multiphase polymer composite 800 can include a polymer matrix phase 801, a first non-polymeric phase including gas voids 803 entrapped within the polymer matrix phase 801, and a second non-polymeric phase including particles 805 embedded within the polymer matrix phase 801.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A medical apparatus comprising:
   a tubular structure comprising an echogenic layer,
   wherein the echogenic layer is a multiphase polymer composite,
   wherein the multiphase polymer composite comprises a polymer matrix phase, a first non-polymeric phase comprising gas voids entrapped within the polymer matrix phase and distributed throughout the echogenic layer, and a second non-polymeric phase comprising particles, which enhance ultrasound visibility, embedded within the polymer matrix phase, and distributed throughout the echogenic layer, and
   wherein the particles are oriented in a specific direction such that the second non-polymeric phase has an anisotropic shape, and interaction between the particles and ultrasound waves is directionally dependent based on the specific direction.

2. The medical apparatus of claim 1, wherein the polymer matrix phase comprises a continuous matrix that is formed from at least one polymer.

3. The medical apparatus of claim 1, wherein the multiphase polymer composite has a closed-cell structure or a semi-closed cell structure.

4. The medical apparatus of claim 1, wherein the particles comprise metal particles, organometallic particles, ceramic particles, inorganic particles, or combinations thereof.

5. The medical apparatus of claim 1, wherein the multiphase polymer composite reduces a dependence of an ultrasound visibility of the tubular structure on an angle of incidence of ultrasound waves on a surface of the tubular structure.

6. The medical apparatus of claim 1, wherein the particles include platelets or rods.

7. The medical apparatus of claim 6, wherein an ultrasound visibility of the tubular structure is dependent on an angle of incidence of ultrasound waves on a surface of the tubular structure.

8. The medical apparatus of claim 1, wherein the tubular structure comprises a catheter.

9. The medical apparatus of claim 1, wherein the tubular structure comprises an endovascular sheath, an endoscope, or an endotracheal tube.

10. The medical apparatus of claim 1, wherein the tubular structure comprises a catheter comprising:
    an inner coil, wherein
    the echogenic layer surrounds the inner coil.

11. The medical apparatus of claim 10, wherein the catheter further comprises a braid surrounding the echogenic layer.

12. The medical apparatus of claim 1, wherein the tubular structure comprises a catheter comprising:
    an outer layer surrounding the echogenic layer.

13. The medical apparatus of claim 12, wherein the echogenic layer comprises a braid.

14. The medical apparatus of claim 13, wherein the catheter further comprises an inner layer, wherein the echogenic layer surrounds the inner layer.

15. The medical apparatus of claim 13, wherein the catheter further comprises an inner coil, wherein the echogenic layer surrounds the inner coil.

16. A medical apparatus comprising:
    a tubular structure comprising an echogenic layer, wherein the echogenic layer is a multiphase polymer composite, wherein the multiphase polymer composite comprises a polymer matrix phase, a first non-polymeric phase comprising gas voids entrapped within the polymer matrix phase, and a second non-polymeric phase comprising particles embedded within the polymer matrix phase, wherein the particles are oriented in a specific direction such that the second non-polymeric phase has an anisotropic shape, and interaction between the particles and ultrasound waves is directionally dependent based on the specific direction; and
    a non-echogenic layer along a portion of a length of the tubular structure, and wherein the non-echogenic layer separates a first section of the echogenic layer from a second section of the echogenic layer.

17. A medical apparatus comprising:
    a tubular structure comprising an echogenic layer, wherein the echogenic layer is a multiphase polymer composite, wherein:
    the multiphase polymer composite comprises a multi-layered structure having a first layer and a second layer,
    the first layer comprises a first polymer matrix phase, a first non-polymeric phase comprising gas voids entrapped within the first polymer matrix phase, and a second non-polymeric phase comprising particles embedded within the first polymer matrix phase,
    the second layer comprises a second polymer matrix phase, a third non-polymeric phase comprises gas voids entrapped within the second polymer matrix phase, and a fourth non-polymeric phase comprises particles embedded within the second polymer matrix phase,
    (i) the gas voids entrapped within the first polymer matrix phase of the first layer have a different type of gas than a respective gas type of the gas voids entrapped within the second polymer matrix phase, and/or (ii) the particles embedded within the first polymer matrix phase of the first layer are a different type of particles than the particles embedded within the second polymer matrix phase, and
    the particles of the first layer and/or the second layer are oriented in a specific direction such that the second non-polymeric phase and/or the fourth non-polymeric phase has an anisotropic shape, and interaction between the particles of the first layer and/or the second layer and ultrasound waves is directionally dependent based on the specific direction.

\* \* \* \* \*